US007893623B2

(12) United States Patent
Haacke

(10) Patent No.: US 7,893,623 B2
(45) Date of Patent: Feb. 22, 2011

(54) HIGH-INTENSITY DISCHARGE LAMP

(75) Inventor: Michael Haacke, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 411 days.

(21) Appl. No.: 11/914,969

(22) PCT Filed: May 17, 2006

(86) PCT No.: PCT/IB2006/051561

§ 371 (c)(1),
(2), (4) Date: Nov. 20, 2007

(87) PCT Pub. No.: WO2006/126144

PCT Pub. Date: Nov. 30, 2006

(65) Prior Publication Data

US 2008/0185967 A1 Aug. 7, 2008

(30) Foreign Application Priority Data

May 23, 2005 (EP) .................................. 05104340

(51) Int. Cl.
*B60Q 1/02* (2006.01)

(52) U.S. Cl. .......................... 315/82; 313/595; 313/600

(58) Field of Classification Search ................... 315/32, 315/82; 313/567–569, 573, 574, 576, 572, 313/595, 600, 602, 618, 620, 621, 622, 623, 313/624, 625, 627, 631, 634, 637, 643, 238, 313/243, 244, 247, 257, 258, 267, 268, 282, 313/283, 288, 293, 294, 301
See application file for complete search history.

(56) References Cited

U.S. PATENT DOCUMENTS 5,128,589 A * 7/1992 Dakin ........................ 313/634
5,726,532 A 3/1998 Wittig et al.
5,736,811 A * 4/1998 Westemeyer et al. ... 313/318.02
6,495,962 B2 * 12/2002 Uemura et al. ................ 315/77
6,750,612 B2 * 6/2004 Takagaki et al. ............ 313/634

FOREIGN PATENT DOCUMENTS

EP 481702 A2 4/1992
EP 883161 A2 12/1998
GB 1562929 3/1980

* cited by examiner

*Primary Examiner*—Douglas W Owens
*Assistant Examiner*—Jianzi Chen

(57) ABSTRACT

A high-intensity discharge (HID) lamp comprising an inner bulb (1) with a discharge vessel (11) and an outer bulb (2), especially for application in an automotive headlight unit is disclosed. A lamp design is proposed by which high thermal stresses and increased quartz temperatures during run-up and steady state operation of the lamp are avoided so that the light output and the lifetime of the lamp is improved. This is substantially achieved by a positioning of the inner and the outer bulb (1, 2) such that a longitudinal axis of the inner bulb (1) is displaced in the operating position of the lamp above a longitudinal axis of the outer bulb (2) so that the distance between the discharge vessel (11) and the outer bulb (2) at the top side of the lamp is decreased and the distance between both at the bottom side is correspondingly increased.

8 Claims, 1 Drawing Sheet

HIGH-INTENSITY DISCHARGE LAMP

Figure 1:
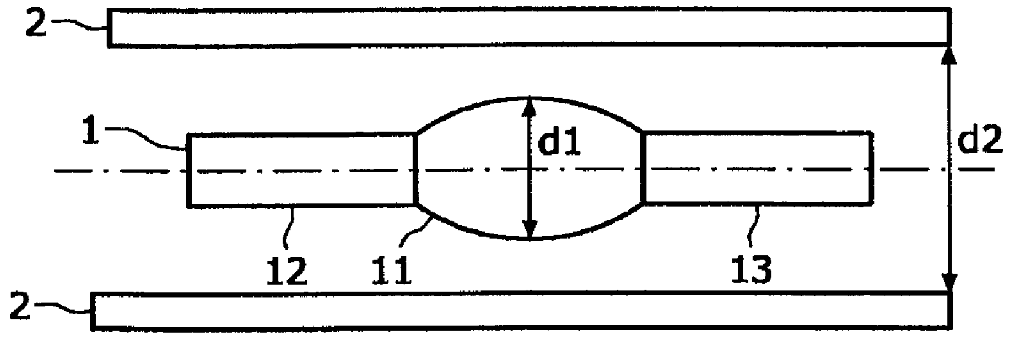
FIG. 1 (Prior art)

The invention relates to a high-intensity discharge (HID) lamp comprising an inner bulb with a discharge vessel and an outer bulb, especially for application in an automotive head-light unit.

High-intensity discharge lamps and especially those which are proposed for use in a head light unit of a vehicle are operated with high power. Furthermore, due to the fact that a spot-like light source is desired in order to achieve a defined radiation characteristic within a certain reflector design, such lamps must have small sizes.

Usually such HID lamps are constructed of an inner bulb (which encloses a discharge gas and a salt filling) and an outer bulb or lamp envelope which surrounds the inner bulb in order to avoid damage of surrounding parts in case of an explosion of the inner bulb and to protect the same against influences from outside. Furthermore, the outer bulb protects the environment against UV radiation.

This construction has the consequence that especially during run-up operation of the HID lamp high thermal stresses can occur in the inner bulb. Furthermore, due to the high temperature of the inner bulb during steady state operation, salt materials which are contained within the discharge volume can chemically react in a considerable extent with the quartz material in the inner bulb wall. This leads to an increased quartz crystallization which has a negative influence on the lifetime behavior of the lamp.

These problems are even more serious in case of a HID lamp which comprises a discharge gas without mercury, because those lamps usually are supplied with currents during run-up and during steady state operation which are higher than in case of a mercury discharge lamp.

EP 0 481 702 discloses heat transfer means for removing heat from a fused quartz arc tube being employed as a light source in an electric discharge lamp. The heat is removed during the operation of the lamp through the tube walls by means of a fused quartz protuberance at the outer surface of an inner tube wall and a corresponding protuberance in the form of a dimple in the wall of an outer tube which extends in the direction of the protuberance at the inner tube.

However, providing a tube or bulb wall of a discharge lamp with such additional structures or variation requires very precise and extensive production methods in order not to involve the risk of weakening the related tube.

Another disadvantage is the fact, that by such protuberances and/or dimples in the wall of the inner and/or outer tube the light radiation characteristic is influenced e.g. with respect to shadowing effects. This is especially disadvantageous in case of an application of the lamp together with a reflector e.g. in a head light unit of a vehicle because this can degrade a desired distribution of the radiated light considerably.

One object underlying the invention is to provide a high-intensity discharge lamp comprising an inner bulb with a discharge vessel for enclosing a discharge gas and an outer bulb surrounding the inner bulb, by which thermal stresses during run-up and steady state operation of the lamp are decreased, without influencing the light radiation characteristic of the lamp to a considerable extent.

Another object underlying the invention is to provide a high-intensity discharge lamp as mentioned above in which especially during steady state operation the highest temperatures are limited to a value which prevents chemical reactions of components contained in the filling of the discharge vessel like especially salt materials, with quartz material in the wall of the inner bulb, without influencing the light radiation characteristic of the lamp to a considerable extent.

Finally, these objects shall be achieved especially for mercury free HID lamps.

These objects are solved according to claim 1 by a high-intensity discharge lamp comprising an inner bulb with a discharge vessel for enclosing a discharge gas and an outer bulb surrounding the inner bulb, wherein a longitudinal axis of the inner bulb is displaced in a horizontal operating position of the lamp above a longitudinal axis of the outer bulb such that the distance between the discharge vessel and the outer bulb is smaller at the upper side of the lamp than at its lower side.

By this, the highest temperature which is generated at the top side of the lamp is decreased due to the enhanced heat conduction at the top side.

An advantage of this solution is the fact, that the efficiency of the lamp, especially the light output, is considerably improved due to an increased temperature at the lower or bottom side which is usually the coldest spot of the lamp. This increased temperature is generated by the increased distance between the discharge vessel and the outer bulb and the correspondingly decreased heat conduction via this distance.

A further advantage is that especially during steady state operation, the temperature difference between the coldest spot and the hottest spot at the walls of the lamp are effectively decreased so that thermal stresses are reduced.

This has the consequence that the lifetime of the lamp is extended especially because the tendency of quartz crystallization of the walls of the lamp is lowered or prevented due to the lower temperature at the hottest spot of the discharge vessel.

It shall be mentioned here that GB 1 562 929 discloses improvements in the construction of a discharge lamp which is designed for horizontal operation, wherein the axis of a cylindrical discharge envelope is displaced substantially vertically below the axis of an outer envelope surrounding the inner envelope, which is evacuated. By this, temperature differences between different parts of the discharge envelope during operation of the lamp shall be reduced due do different intensities of heat radiation from the upper and the lower parts of the lamp. In contrary to this, the cooling and heating mechanisms which are effective in a lamp according to the invention are based on heat conduction so that this prior art is considered not relevant.

The subclaims disclose advantageous embodiments of the invention.

Claim 2 discloses an embodiment comprising an asymmetrical form of the inner bulb.

The embodiment according to claim 3 has the advantage that the cooling at the top side is further enhanced. For this embodiment the wall material of the lamp is preferably selected according to claim 4 in order not to decrease the lifetime of the lamp.

Claims 5 and 6 have the advantage that the cooling efficiency and thus the decrease of thermal stresses is effectively improved.

The embodiment according to claim 7 is especially provided for automotive applications.

Finally, claim 8 discloses preferred dimensions of a lamp according to the invention.

Figure 2:
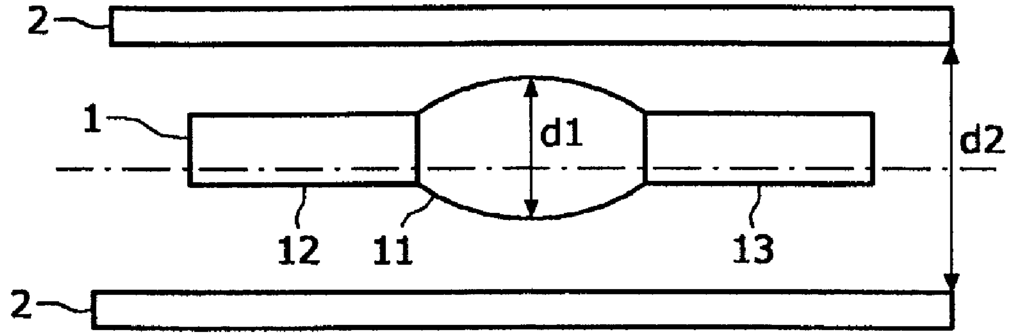
Figure 3:
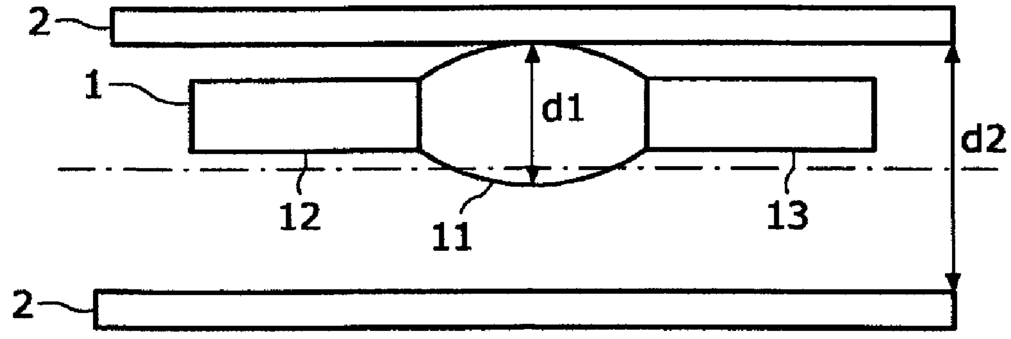

Further details, features and advantages of the invention become obvious from the following description of preferred embodiments with reference to the drawings in which shows:

FIG. 1 a schematic longitudinal section through the main parts of a discharge lamp for horizontal operating position;

FIG. 2 a schematic longitudinal section through a first embodiment of a lamp according to the invention and FIG. 3 a schematic longitudinal section through a second embodiment of a lamp according to the invention.

FIG. 1 shows a typical construction of a high intensity discharge lamp in a longitudinal section which involves the above mentioned problems during the run up and steady state operation. The lamp is provided for horizontal operation and comprises an inner tube or bulb 1 and an outer tube or bulb or lamp envelope 2 (of which only a section is shown) which surrounds the inner bulb 1.

The inner bulb 1 comprises a first central portion or discharge vessel 11 having a first diameter d1 for enclosing a discharge volume. At axially opposing ends of the discharge vessel 11 a first and a second elongated pinch portion 12, 13 is provided for enclosing electrical contacts for electrodes (not shown) which extend into the discharge vessel 11 and between which a gas discharge is excited. The inner bulb 1 is enclosed by the substantially cylindrical outer bulb 2 having a second diameter d2.

According to a first embodiment of the invention which is schematically shown in FIG. 2 in a longitudinal section, the inner bulb or tube 1 is displaced relative to the outer bulb or tube 2 in a direction towards the upper or top side of the lamp in its operating position, so that the distance between the upper wall sections of the outer tube 2 and the adjacent wall sections of the discharge vessel 11 is smaller than the distance between the lower wall sections of the outer tube 2 and the adjacent wall sections of the discharge vessel 11.

This construction has two substantial advantages. By decreasing the distance between the outer and the inner quartz bulb 1, 2 at the top side of the lamp in its operating position, the high temperature areas of the discharge vessel 11 can effectively be cooled by increased heat conduction. Simultaneously, by the greater distance between the discharge vessel 11 and the outer quartz bulb 2 at the bottom of the lamp in its operating position, the temperature of the coldest spot is increased due to a decreased heat conduction through the greater distance and by this the light output is improved considerably.

Both the minimum distance at the top side and the maximum distance at the bottom side of the lamp between the inner and the outer bulb 1, 2 can be achieved very simple by an adequate adjustment of related mounting means for at least one of the bulbs 1, 2.

Preferably the outer bulb 2 is filled with a gas having a pressure between about 10 mbar and about 1 bar, more preferably between 30 mbar and 800 mbar. Experiments have shown that in this pressure range the heat conduction is very constant in a temperature range which usually occurs during normal lamp operation so that a selected positioning between both bulbs 1, 2 is optimal under almost all operating conditions. In case of a gas pressure below 10 mbar the heat conduction decreases significantly.

Preferably the gas within the outer bulb 2 comprises at least one of the following substances: humid air, dry air, $N_2$, $O_2$, $H_2$, $CO_2$, Ar, Ne, Xe, Kr.

FIG. 3 shows a second embodiment of the invention, in which corresponding parts and components as in FIGS. 1 and 2 are denoted with the same reference signs.

According to this embodiment the inner bulb or tube 1 is displaced relative to the outer bulb or tube 2 to such an extent that the discharge vessel 11 contacts the wall of the outer bulb 2. By this, the cooling of the discharge vessel 11 is further increased. However, in order to avoid damage of the outer bulb 2 it is preferred that the outer bulb 2 is made of a potassium free material.

The outer diameter d1 of the discharge vessel 11 of a typical lamp according to the invention is for example preferably about 6 mm, especially 6.05 mm, whereas the inner diameter d2 of the outer tube or bulb 2 is about 6.7 mm. The extent of displacement of the inner bulb 1 relative to the outer bulb 2 is chosen in dependence on certain parameters like the lamp filling and heat conduction within the outer bulb 2 and through the wall of the outer bulb 2, in dependence on the power of the lamp and the material from which the bulbs are manufactured.

Finally, instead of or additionally to displacing the outer and the inner bulb 1, 2 relative to each other as explained above, the discharge vessel 11 and especially its volume can be formed and dimensioned asymmetrically such that an upper part of the wall of the discharge vessel 11 has a smaller distance to the adjacent wall of the outer bulb 2 at the upper or top side of the lamp in its operating position, than a lower part of the wall of the discharge vessel 11 to the lower wall of the outer bulb 2.

The invention claimed is:

1. A high-intensity discharge lamp comprising an inner bulb with a discharge vessel for enclosing a discharge gas, and an outer bulb surrounding the inner bulb, wherein the inner bulb is radially symmetrically formed about a first longitudinal axis and the outer bulb is radially symmetrically formed about a second longitudinal axis, wherein the first longitudinal axis of the inner bulb is displaced in a horizontal operating position of the lamp above the second longitudinal axis of the outer bulb such that the distance between the discharge vessel and the outer bulb is smaller at the upper side of the lamp than at the lower side of the lamp.

2. A high-intensity discharge lamp according to claim 1, wherein the distance between the discharge vessel and the outer bulb at the upper side of the lamp is zero.

3. A high-intensity discharge lamp according to claim 2, wherein the wall material of the discharge vessel and of the outer bulb is free of potassium.

4. A high-intensity discharge lamp according to claim 1, wherein the outer bulb is filled with a gas having a pressure in the range between about 10 mbar and about 1 bar.

5. A high-intensity discharge lamp according to claim 4, wherein the gas comprises at least one of the following substances: humid air, dry air, $N_2$, $O_2$, $H_z$, $CO_2$, Ar, Ne, Xe, Kr.

6. A high-intensity discharge lamp according to claim 1, wherein the discharge gas is free of mercury.

7. A high-intensity discharge lamp according to claim 1, wherein the outer diameter of the discharge vessel is about 6 mm and the inner diameter of the outer bulb is about 6.7 mm.

8. A headlight unit for a vehicle, comprising a high-intensity discharge lamp according to claim 1.

* * * * *